(12) United States Patent
Grano

(10) Patent No.: US 9,296,364 B2
(45) Date of Patent: *Mar. 29, 2016

(54) DEVICE FOR REMOVING SNOW FROM A VEHICLE

(76) Inventor: Anthony Albert Grano, Hebron, CT (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/584,434

(22) Filed: Nov. 24, 2009

(65) Prior Publication Data

US 2011/0121588 A1  May 26, 2011

(51) Int. Cl.
*E01H 5/02* (2006.01)
*B60S 3/04* (2006.01)

(52) U.S. Cl.
CPC ........................................ *B60S 3/045* (2013.01)

(58) Field of Classification Search
CPC ....................................................... B60S 3/045

USPC ......... 294/1.1, 54.5, 219, 214; 15/220.1, 160, 15/227, 236.02, 117, 22.1; 2/16, 160
See application file for complete search history.

(56) References Cited

U.S. PATENT DOCUMENTS

| | | | | |
|---|---|---|---|---|
| 3,355,187 | A  * | 11/1967 | Brindle ........................... | 280/19 |
| 6,758,596 | B2 * | 7/2004  | McDonough ..................... | 383/4 |
| 7,861,361 | B2 * | 1/2011  | Boucher ..................... | 15/220.1 |
| 2007/0025646 | A1 * | 2/2007 | Schoenig et al. ................. | 383/4 |

* cited by examiner

*Primary Examiner* — Gabriela Puig
(74) *Attorney, Agent, or Firm* — Wasserbauer Law; Damian Wasserbauer, Esq

(57) ABSTRACT

A device for removing snow from a vehicle comprising a flat sheet of sturdy flexible material having elongated opposite side sections and substantially shorter opposite end sections. Each end section has a spaced apart pair of handles for manual manipulation of the sheet and each end section has two spaced apart straps with hooks at the end. An end of the sheet is entered in a door opening with the sheet stretched over the top of the vehicle and moved back and forth to remove snow and a pair of hooks may be engaged with a fender edge with the sheet stretched over the hood or trunk lid to remove snow.

10 Claims, 4 Drawing Sheets

DEVICE FOR REMOVING SNOW FROM A VEHICLE

BACKGROUND OF THE INVENTION

A wide variety of devices are available for the removal of snow from vehicles which may be exposed to the accumulation of a substantial amount of snow for example during overnight outdoor parking. Such prior art snow removal devices, however, generally take the form of small hand held scrapers, shovels, brushes and the like which may be effective in removing the snow but only after tedious and time consuming use in weather which may be most unpleasant and perhaps even a dangerous activity at sub zero temperatures.

It is the general object of the present invention to provide a snow removal device characterized by simplicity of use and which is capable of thoroughly clearing snow from a vehicle in a fraction of the time required for removing the snow with prior art devices.

SUMMARY OF THE INVENTION

In fulfillment of the foregoing object and in accordance with the present invention a flat sheet of sturdy but flexible material is provided and has similar elongated opposite side sections and similar substantially shorter end sections. The length of the sheet is at least equal to the average width of the vehicles to be served. At each end section a pair of spaced apart gripping means is provided for the convenient manual manipulation of the sheet by the hands of the user.

At least one end section also has at least one small hook positioned with its open end facing toward the sheet of material.

The sheet is optionally of Nylon fabric and between five (5) and ten (10) feet in length and between one-half (½) and four (4) feet in width and preferably between six (6) and eight (8) feet in length and approximately two (2) feet in width.

In presently preferred form the sheet of material also has a bungee cord attached along each side edge with the sheet bunched up to approximately one half its length by the cord but extendable to its flat condition by pulling forces exerted at opposite ends.

The griping means may vary in form but preferably takes the form of a pair of handles on each end section constructed of rust resistant material.

At least one and preferably both end sections of the sheet of material are provided with a pair of spaced apart straps each carrying a hook at its free end positioned with its open end facing toward the sheet of material. Optionally, each strap and adjacent end section are provided with Velcro means for storage of the straps and hooks in folded back position on the sheet of material.

A method of using the snow removal device first involves the placement of one end section of the sheet of material in a door opening at the top of the opening, closing of the door trapping the end section and the subsequent manual manipulation of the opposite end of the sheet of material to swing the same upwardly and over the top of the vehicle and along its length and perhaps back and forth longitudinally to clear the roof and at least portions of the hood and trunk lid of snow.

The next step, or the first step if the procedure is reversed, involves removing the sheet of material from the door opening and engaging the hooks of one end section with a tire well, or more specifically a fender edge which defines a tire well. The opposite end of the sheet of material can then be grasped manually and swung upwardly and over the top of the vehicle and then moved longitudinally back and forth to clear the hood or trunk lid of snow depending on which tire well or fender edge is engaged by the hooks.

When the device is used by two persons it is even more efficient and highly expeditious involving merely the positioning of the users on opposite sides of the vehicle and their longitudinal movement in perhaps one or two sweeps thus removing snow completely from the vehicle roof, hood and trunk lid almost instantaneously.

DESCRIPTION OF PREFERRED EMBODIMENT

Figure 1:
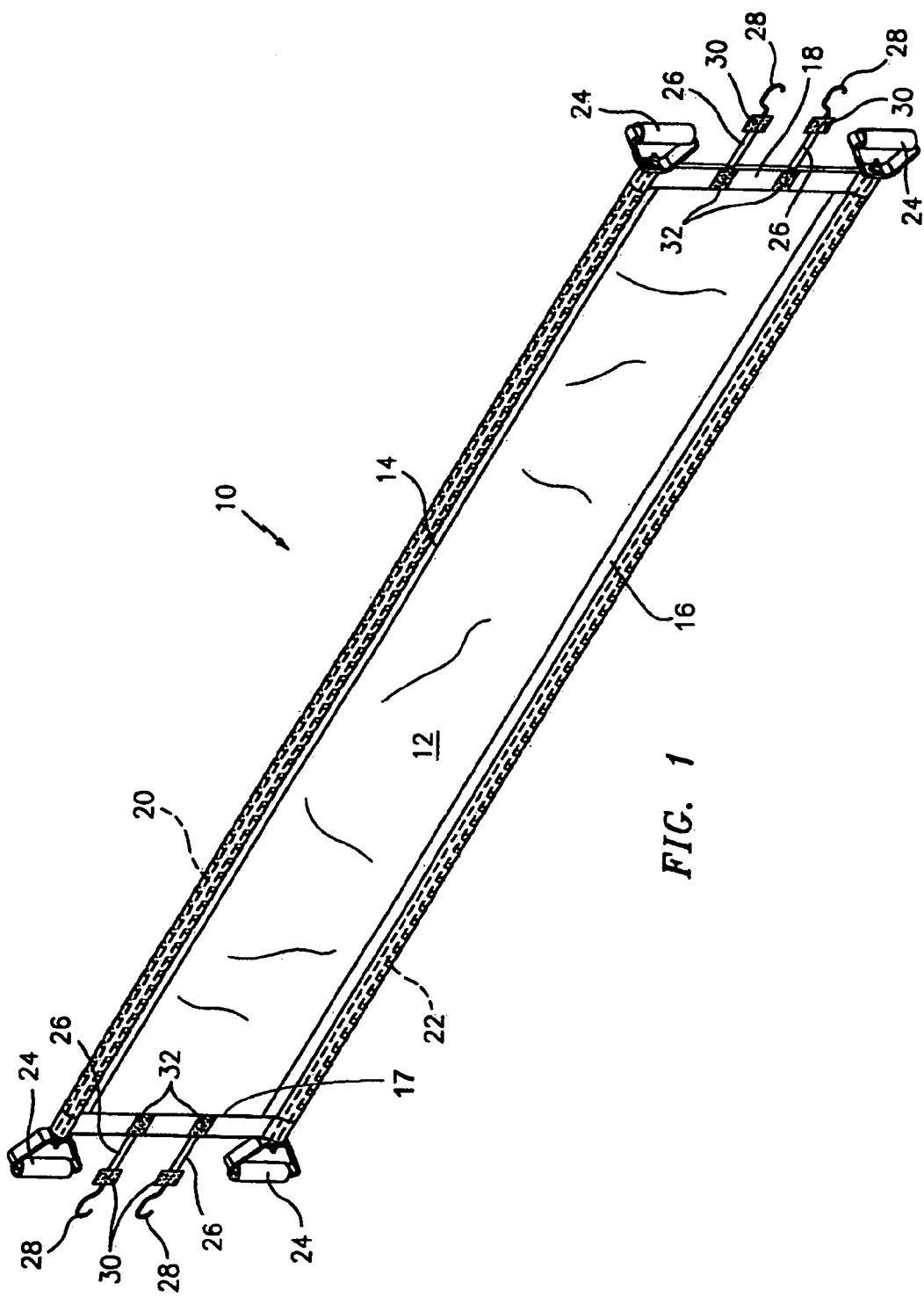
FIG. 1 is a perspective view of the snow removal device.

Referring particularly to FIG. 1 an improved snow removal device of the present invention is indicated generally at 10. Similar opposite side sections 14 and 16 of a flat sheet of sturdy material 12, preferably of Nylon fabric, are elongated and similar end sections 17 and 18 are substantially shorter. Bungee cords 20 and 22 are attached respectively to the side sections 14 and 16 and cause the sheet of material 12 to bunch up (not shown) to approximately one-half its flat length.

Each end section 17 and 18 has a pair of spaced apart handles 24, 24 or rust resistant construction to be grasped by the hands of a user for extension of the sheet of material to its flat length and other manual manipulation of the device. Also, in the present preferred form of the device each end section 17 and 18 has a pair of spaced apart straps 26, 26 each carrying a small hook 28 at its free end, the hooks 28, 28 each having an open end facing toward the sheet of material 12.

Finally, each strap 26 is optionally provided with a small Velcro patch 30 which cooperates with a similar Velcro patch 32 on the sheet of material 12 to hold the strap in a folded back storage position on the material.

Figure 2:
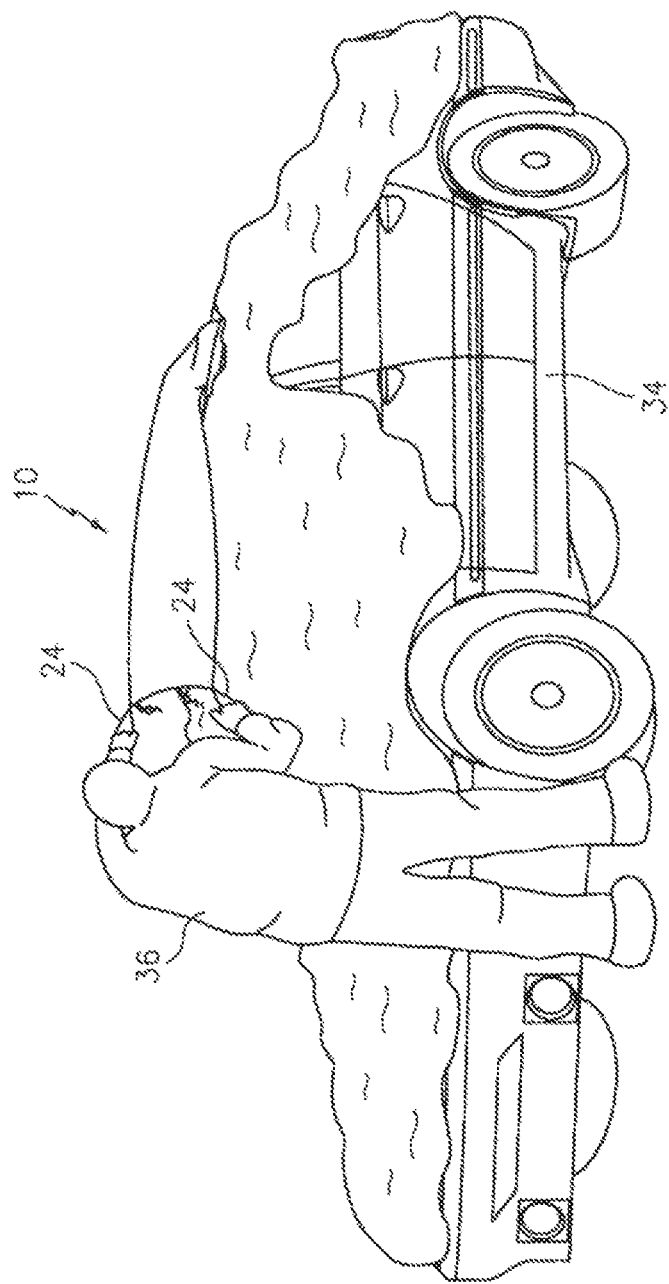
FIG. 2 is a perspective view illustrating a method of using the device with one end of the sheet of material captured in a door opening.

A method of using the snow removal device of the invention is illustrated in FIG. 2 wherein one end of a device 10 has been entered into a right rear door opening of a vehicle 34 and the opposite end grasped at handles 24,24 by a user 36 and swung upwardly and over the top of the vehicle and then longitudinally forwardly to clear the roof of the vehicle. Obviously the device may also be swung rearwardly and downwardly too at least partially clear the trunk lid.

Figure 3:
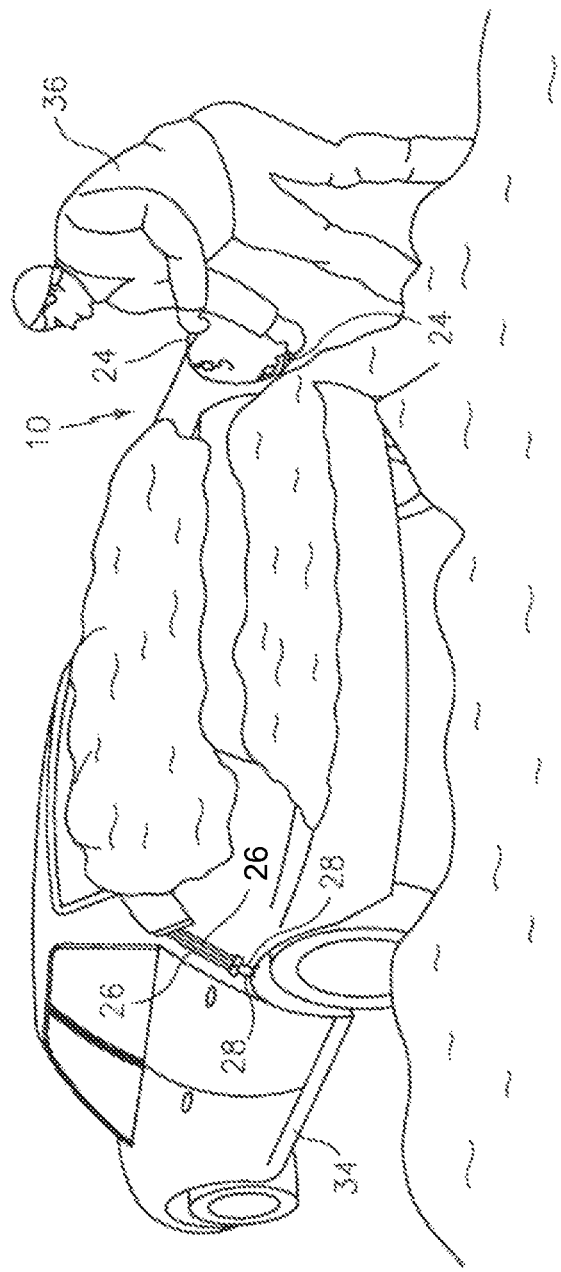
FIG. 3 is a perspective view showing one step in the method of the invention wherein the sheet of material is attached to the edge of a fender adjacent a wheel well.

In FIG. 3 the device has been secured with its hooks on one end section on the edge of a rear fender adjacent a wheel well and the opposite end of the device has been swung upwardly and over the vehicle and then downwardly to completely clear the rear window and trunk lid of the vehicle 34.

Figure 4:
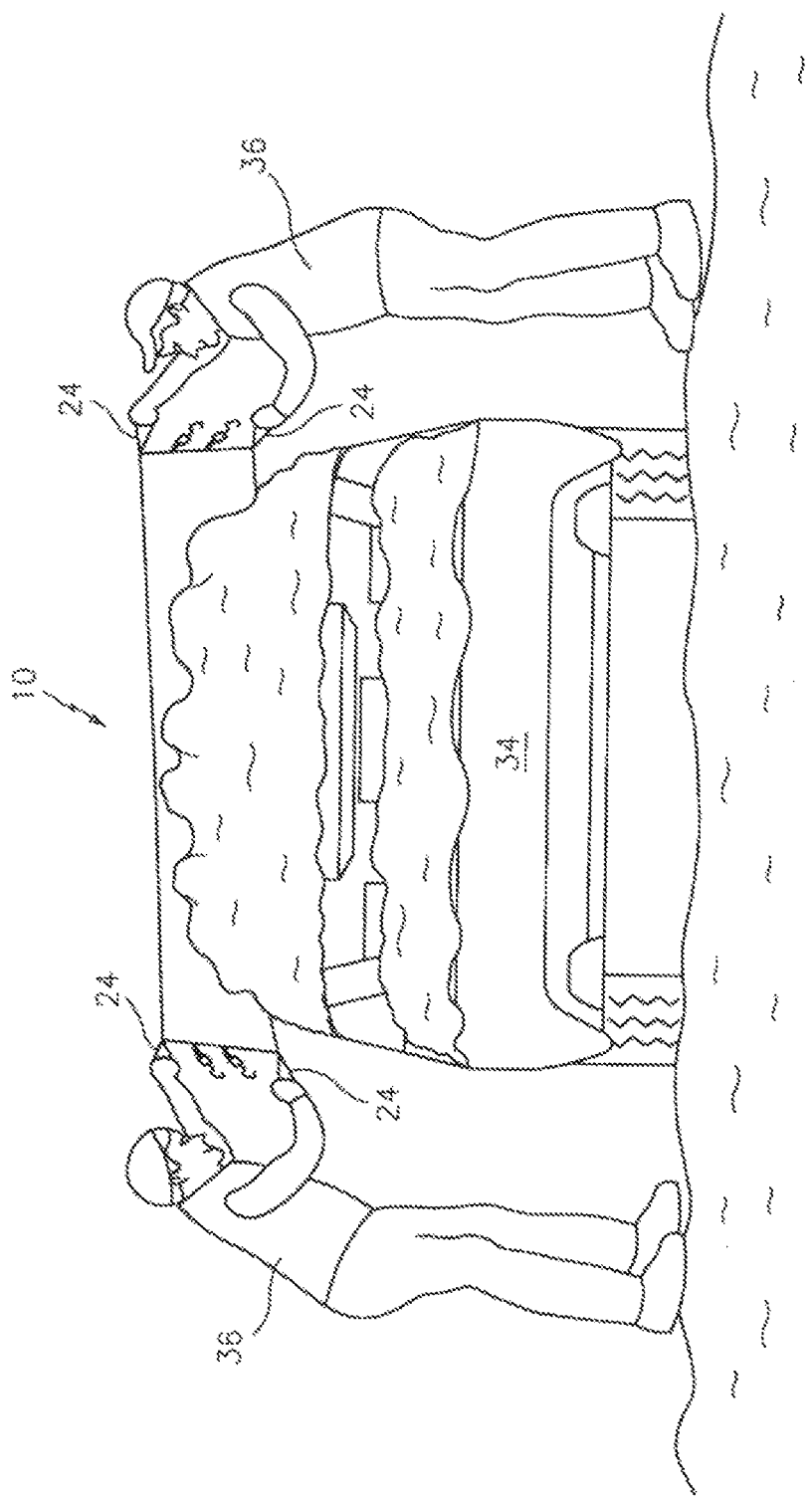
FIG. 4 is a perspective view showing a two-person snow clearing procedure.

FIG. 4 illustrates a two person version of the method of the invention wherein each user grasps an end section of the device and both merely walk simultaneously along the length of the vehicle clearing snow from the roof, hood and trunk lid in a single step procedure and in a most efficient and expeditious manner.

As will apparent from the foregoing, a greatly improved snow removal device and method have been provided whereby the task of snow removal from a vehicle can be readily accomplished in a highly efficient manner and, most importantly, in only a fraction of the time consumed in snow removal with prior art devices.

The invention claimed is:

1. A device for removing snow from a vehicle comprising a flat sheet of sturdy but flexible material having similar elongated opposite side sections and similar substantially shorter opposite end sections, the length of the sheet being at least equal to the average width of vehicles to be served thereby, each end section having spaced apart gripping means for the manual manipulation of the sheet by the hands of a user, and at least one end section having at least one small hook positioned with its open end facing toward the sheet of material wherein a bungee cord is attached along each side edge of the sheet of material and tends to cause the sheet to bunch up to approximately one half its flat length, the sheet being extended to its flat length by pulling forces exerted at opposite ends on the gripping means.

2. A snow removal device as set forth in claim 1 wherein the length of the sheet of flexible material is between five (5) and ten (10) feet and the width between one-half (½) and four (4) feet.

3. A snow removal device as set forth in claim 1 wherein the length of the sheet of material is between six (6) and eight (8) feet and the width is approximately two (2) feet.

4. A snow removal device as set forth in claim 1 wherein said gripping means takes the form of a pair of handles constructed of a rust resistant material.

5. A snow removal device as set forth in claim 1 wherein at least one end of the sheet of material is provided with a pair of spaced apart straps each carrying a hook at its free end positioned with its open end facing toward the sheet of material.

6. A snow removal device as set forth in claim 1 wherein the sheet of material is constructed of Nylon fabric.

7. A method for clearing snow from a vehicle employing the device of claim 1 wherein a team of two persons respectively grasps opposite ends of the sheet of material and both move lengthwise of the vehicle simultaneously with the sheet of material stretched above and across the vehicle for removing snow from the top and the hood and deck of the vehicle.

8. A device for removing snow from a vehicle comprising a flat sheet of sturdy but flexible material having similar elongated opposite side sections and similar substantially shorter opposite end sections, the length of the sheet being at least equal to the average width of vehicles to be served thereby, each end section having spaced apart gripping means for the manual manipulation of the sheet by the hands of a user, and at least one end section having at least one small hook positioned with its open end facing toward the sheet of material wherein at least one end of the sheet of material is provided with a pair of spaced apart straps each carrying a hook at its free end positioned with its open end facing toward the sheet of material; each strap and adjacent end section of the sheet of material is provided with Velcro means for storage of the straps and hooks in folded back position upon the sheet of material.

9. A method of removing snow from a vehicle employing a device comprising a flat sheet of sturdy but flexible material having similar elongated opposite side sections and similar substantially shorter opposite end sections, the length of the sheet being at least equal to the average width of vehicles to be served thereby, each end section having spaced apart gripping means for the manual manipulation of the sheet by the hands of a user, and at least one end section having at least one small hook positioned with its open end facing toward the sheet of material, the method comprising the steps of:
 positioning one end section of the sheet of material inside a door opening at the top of the opening and the door is then closed trapping the end portion, and
 swinging up and over the top of the vehicle the opposite end of the sheet of material by a motion of the user grasping the opposite end with the user working from the opposite side of the vehicle and moving back and forth along the length of the same to clear the roof and at least portions of the hood and rear deck of snow.

10. A method for clearing snow from a vehicle employing a device comprising a flat sheet of sturdy but flexible material having similar elongated opposite side sections and similar substantially shorter opposite end sections, the length of the sheet being at least equal to the average width of vehicles to be served thereby, each end section having spaced apart gripping means for the manual manipulation of the sheet by the hands of a user, and at least one end section having at least one small hook positioned with its open end facing toward the sheet of material, the method comprising the steps of:
 engaging the hook with a tire well, and
 swinging up and over the top of the vehicle the opposite end of the sheet of material by a motion of the user grasping the opposite end and then moved back and forth with the user moving lengthwise of the vehicle to readily clear the hood or rear deck depending on the wheel well engaged.

* * * * *